United States Patent Office 3,266,933
Patented August 16, 1966

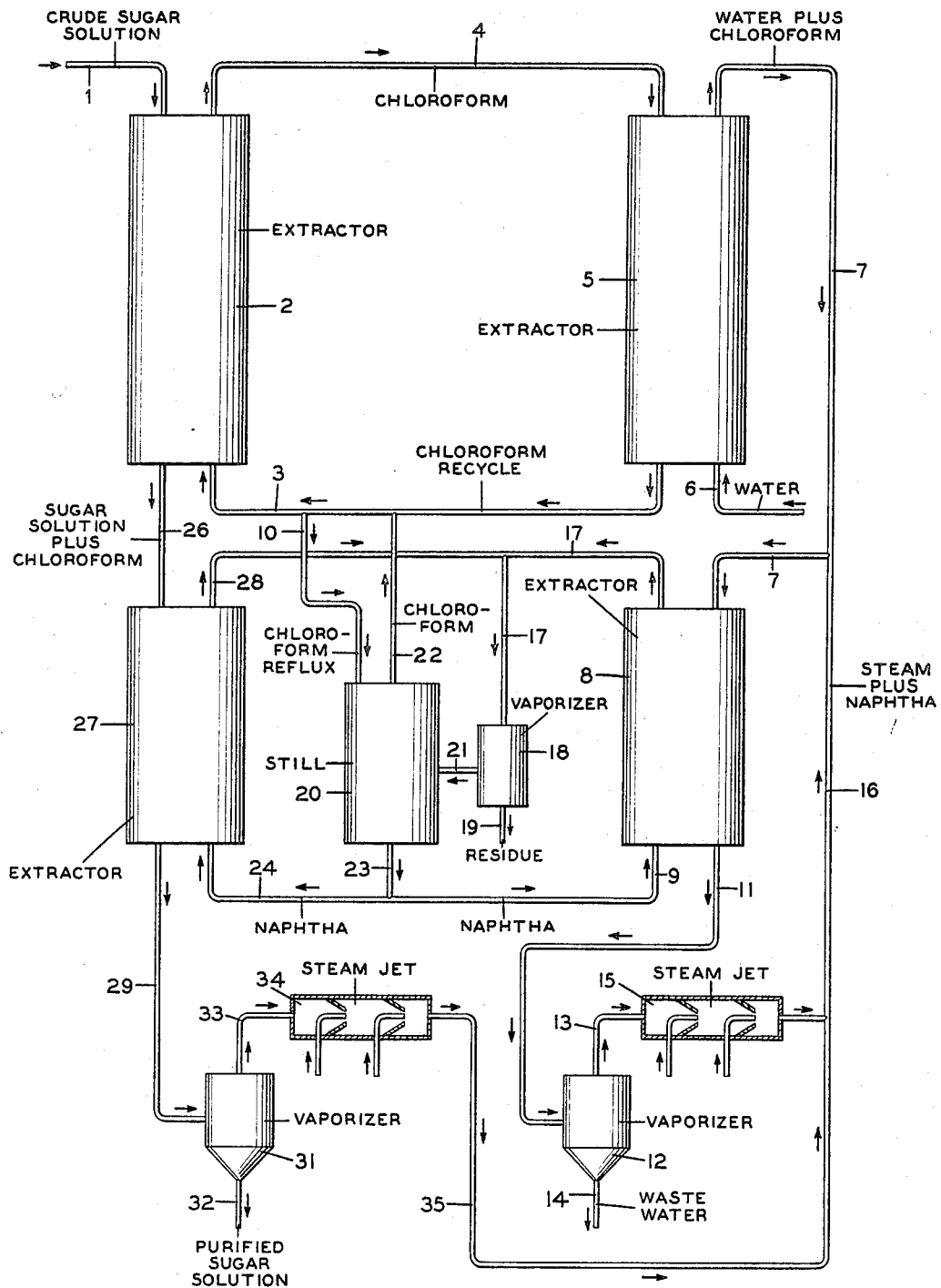

3,266,933
PROCESS FOR THE EXTRACTION OF AQUEOUS SUGAR SOLUTION RESULTING FROM THE HYDROLYSIS OF LIGNOCELLULOSIC MATERIAL
Frank Porter, Morris Township, Morris County, N.J., assignor to Allied Chemical Corporation, New York, N.Y., a corporation of New York
Filed Dec. 3, 1964, Ser. No. 415,608
4 Claims. (Cl. 127—37)

This invention relates to the hydrolysis of lignocellulose materials and more particularly to a process for the purification of the sugar solution produced thereby.

It is well known, of course, to hydrolyze woody and other lignocellulose materials to pentose and hexose sugars which, being water soluble, are separated from the residual lignin. It also has been proposed to inoculate an aqueous solution of the sugars with yeast, converting the sugars to a protein nutrient. This nutrient, as well as the sugars themselves, forms a potential source of protein and carbohydrate feed for use in feeding livestock.

This suggested utilization of the lignocellulose-derived sugars heretofore has not been successful on a commercial basis, in part because of economic considerations, but also in large measure because of the contemporaneous production, along with the sugars, of various degradation products derived from the cellulose and lignin content of the original lignocellulose material. The identity of these degradation products is variable, depending upon the nature and duration of the hydrolytic reaction to which they owe their genesis, but in general they comprise such materials as various organic acids, furfural and other aldehydes, and various tarry materials.

The presence of such degradation products in the sugars results in at least two serious disadvantages. In the first place, if the sugars are fed directly to livestock as the carbohydrate component of a feed mixture, the degradation products render the feed unpalatable to the livestock, and if eaten, interfere with their normal metabolic processes. In the second place, if the sugars are inoculated with yeast, the degradation products interfere with the growth of the yeast, possibly by coating over the yeast cells or altering them so that their reproduction by normal budding is inhibited.

It has been proposed to remove these degradation products by treating the sugar solution with a suitable solvent calculated to dissolve selectively the organic impurities, without dissolving the sugars and without reacting with them. A solvent which has received considerable attention for this purpose is chloroform which is particularly effective because of its ability to extract the degradation products without reacting with the sugars. Unfortunately, however, the removal of the organic impurities by employment of chloroform as a solvent has several disadvantages. For example, it is necessary from a practical economic standpoint, that the chloroform employed for the extraction procedure be recovered and desirably recycled in the process. Current procedures provide for recovery of the chloroform by treatment with water. In this procedure, it is necessary to heat the sugar solution and the water used for regeneration of chloroform up to about 100° C. in the presence of stripping towers containing about 20 or more plates. This procedure is obviously a costly one.

It is an object of the present invention to provide a process for producing substantially pure sugars which are uncontaminated by hydrolysis-induced degradation products, which process may be applied without major disarrangement of the conventional lignocellulose hydrolyzing procedures, which is practical and not prohibitively expensive and which does not introduce unwanted impurities into the desired sugar products.

Another object is to provide a process for the regeneration of the chloroform used in extracting the degradation products.

Other objects and advantages will be apparent from the following detailed description.

In accordance with the present invention, there is provided a process for the extraction of aqueous sugar solution resulting from the hydrolysis of lignocellulosic material to remove hydrolytic degradation products which comprises (a) passing the aqueous sugar solution in contact with chloroform solvent in an extraction zone, (b) discharging from the extraction zone the chloroform solvent containing dissolved hydrolytic degradation products and a separate stream of a sugar solution substantially free from hydrolytic degradation products and contaminated with small amounts of chloroform, (c) passing the chloroform solvent containing the dissolved hydrolytic degradation products through a second extraction zone in contact with water to extract the bulk of the hydrolytic degradation products from the chloroform, (d) discharging from the second extraction zone a stream of chloroform and a separate stream of water containing the hydrolytic degradation products together with small amounts of chloroform and recycling the stream of chloroform to the first extraction zone, (e) passing the stream of water containing the hydrolytic degradation products together with small amounts of chloroform through a third extraction zone in contact with naphtha to separate the chloroform from the water, (f) discharging from the third extraction zone water containing small amounts of naphtha and a separate stream containing naphtha and chloroform, (g) heating said water and naphtha discharged from the third extraction zone to vaporize the naphtha, and recycling the naphtha back to the third extraction zone, (h) heating the chloroform-naphtha solution from the third extractiaon zone to separate the chloroform from the naphtha and recycling the chloroform to the first extraction zone, (i) recycling a portion of the separated naphtha back to the third extraction zone for further contact with water and chloroform from the second extraction zone, (j) passing the sugar solution discharged from the first extraction zone and containing small amounts of chloroform in contact with the remaining portion of naphtha in a fourth extraction zone to separate the chloroform from the water thereby producing a naphtha stream containing dissolved chloroform and a separate stream of substantially pure sugar solution contaminated with a small amount of naphtha, (k) discharging the naphtha stream from the fourth extraction and admixing the naphtha stream with the chloroform naphtha from the third extraction zone, (l) discharging from the fourth extraction zone said sugar solution and heating said sugar solution to vaporize the naphtha to leave as residue a substantially pure sugar solution.

(m) recycling the vaporized naphtha back to the third extraction zone.

The hydrolysis of the lignocellulose materials may be carried out by conventional procedures either in single or multiple stages as desired. A particularly effective procedure is described in my copending application Serial No. 370,929 filed May 28, 1964. Whatever conventional procedure employed for the hydrolysis of the lignocellulose materials, at the termination of a selected stage or at the conclusion of the reaction the liquid fraction containing the sugars is extracted with a chloroform solvent which removes selectively the undesired degradation products and the chloroform solvent is recovered for use in the process by contacting the chloroform with petroleum naphtha. The petroleum naphtha selectively extracts the chloroform and also removes certain degradation products which are not removed by the chloroform and after separation of the chloroform is recycled in the process.

Preferably, the liquor to be treated which originally has a pH from 1 to 2 is neutralized to about 3 to 4 preliminary to the chloroform extraction. This converts the mineral acid content of the liquor to the corresponding salts leaving any organic acids which may be present as the free acids which then are removed selectively in the solvent phase. As a consequence, there is formed an aqueous solution of sugars free from hydrolytic degradation products of cellulose which is well suited for use as stock feed or as a yeast growing medium.

The accompanying drawing illustrates a method of carrying out the process of the present invention.

A crude sugar solution containing about 10 to 15% by weight sugar and which may be produced according to any of the conventional procedures for the hydrolysis of wood is fed through line 1 into a conventional eight stage extractor 2 in counterweight contact with chloroform which enters extractor 2 through line 3. The temperatures employed may be ambient temperatures, that is, temperatures from about 25–35° C. The chloroform to aqueous sugar solution weight ratio employed for this extraction procedure is in the range of from 4 to 1–6 to 1 preferably in the range of about 5 to 1.

The chloroform in its passage through extractor 2 removes the hydrolytic degradation products from the sugar solution which comprise principally furfural, organic acids such as levulinic acid and various tarry materials. The amount of these degradation products varies and depend somewhat on the source of lignocellulose materials. In general, however, they are present in an amount of about 5 to 10% by weight. It is essential that these degradation products be removed from the chloroform prior to recycle in the process because after a short period of time, the chloroform would become contaminated with an excessive amount of degradation products and would seriously impair the extraction efficiency. Provision is made for removal of these degradation products from the chloroform by means of a second eight-stage extractor 5, into which the chloroform leaving extractor 2 enters through line 4. The chloroform is passed countercurrent with water which enters the extractor 5 through line 6. During this extraction step, the chloroform containing the hydrolytic degradation products contacts the water at temperatures from about 25–35° C. The bulk of the hydrolytic degradation products i.e., about 90% by weight may be removed from the chloroform by employing a weight ratio of chloroform to water of from about 2–3 to 1 preferably 2.5 to 1. However, some of the hydrolytic degradation products such as a resinous material remain in the chloroform after this initial treatment and these may be removed by a subsequent treatment as will hereinafter be explained. The chloroform with the bulk of the hydrolytic degradation products removed is discharged from extractor 5 and directed through line 3 into the first extractor for re-use in the process. A portion of the chloroform stream, however, may be directed to distilation apparatus 20 through line 10 to effect further removal of those hydrolytic degradation products not removed in extractor 5. The water containing the hydrolytic degradation products leaves extractor 5 through line 7 and carries with it small amounts of dissolved chloroform i.e., about 0.8% which should be removed and desirably recycled for further contact with the crude sugar solution in extractor 2. This is effected by directing the water containing the dissolved chloroform into a third extractor 8 containing five stages where it contacts petroleum naphtha in countercurrent flow, the naphtha entering extractor 8 through line 9. The weight ratio of naphtha to water employed is generally in the range of 0.02–0.2, preferably 0.03, to 1. The chloroform having a greater solubility in naphtha than in water passes into the naphtha solvent together with small amounts of degradation products. The temperature employed for this extraction step is within a range of about 10 to 50° C. Water containing small amounts of naphtha i.e., about 0.01% naphtha is discharged from extractor 8 through line 11 where it is further treated to recover the naphtha which is thereafter recycled in the process. This treatment consists of passing the water-naphtha solution through a vaporizer 12 where the water containing the degradation products and naphtha is heated to a temperature within a range of about 45 to 90° C. under vacuum maintained by steam jet 15. Water, substantially free of naphtha and contaminated with the bulk of the hydrolytic degradation products removed in the process is discharged from vaporizer 12 through line 14 and may be discarded. The naphtha which at this point is also contaminated with some degradation products discharges from the vaporizer 12 through line 13 and passes through the steam jet 15. Naphtha together with small amounts of steam leave steam jet 15 through line 16 and are admixed with water and chloroform in line 7 where the admixed stream is directed to extractor 8. Chloroform and naphtha together with small amounts of residual impurities are discharged from extractor 8 through line 17 and enter vaporizer 18 where the mixture is heated to separate the chloroform and naphtha from residual impurities. The temperature employed for vaporization is within a range of about 140 to 160° C. At these temperatures, the chloroform and naphtha volatize from the residual impurities and the residual impurities are discharged from vaporizer 18 through line 19. The combined vapors of naphtha and chloroform are then introduced into a distillation apparatus 20 through line 21 which is operated at a bottoms temperature between about 60 to 130° C. At these temperatures, chloroform is taken as overhead through line 22 where it is admixed with additional chloroform in line 3 and returned to extractor 2. Naphtha is discharged from the distillation column through line 23 and a portion of the naphtha stream is directed to extractor 8 through line 9 for contact with water and chloroform which enter through line 7.

The sugar solution which passes through extractor 2 is discharged through line 26 together with small amounts of dissolved chloroform and is directed to a five-stage extractor 27. For economic reasons, it is highly desirable that the chloroform which is present in an amount of about 0.8 to 1.0% in the sugar solution, also be recovered and recycled in the process. This recovery is effected by directing the remaining portion of the naphtha, i.e., about one third of the naphtha discharged from distillation apparatus 20 through line 23 thence through line 24 into extractor 27 where it passes in countercurrent contact with the sugar solution at a temperature in the range of 10 to 50° C., and at a weight ratio with the sugar solution of about 0.02 to 0.2. The naphtha selectively removes the chloroform from the water and leaves extractor 27 through line 28 where it is admixed in line 17 with the chloroform-naphtha stream leaving extractor 8, and the admixture then enters vaporizer 18 for separation of chloroform from naphtha as explained previously. The sugar solution contaminated with small amounts of naphtha, i.e., about 0.01% naphtha is discharged from extractor 27 through line 29 and enters vaporizer 31 where the sugar solution containing the dissolved naphtha is heated to a temperature within a range of about 25 to 50° C. under vacuum maintained by steam jet 34. A purified sugar solution substantially free of naphtha and impurities is discharged from the vaporizer through line 32 where it is directed to further treatment to produce a stock feed or to be employed as a yeast-growing medium. Naphtha is discharged from the vaporizer through line 33 and passes through steam jet 34, and naphtha, together with small amounts of steam, are recycled to extractor 8 through line 35 thence through lines 16 and 7.

The following example will illustrate the process of the invention.

*Example*

5700 parts by weight of dry Douglas fir sawmill waste including largely sawdust and shavings was mixed in a double ribbon blender with about 14,250 parts of dilute sulfuric acid solution having a concentration of about 0.4%. The resulting mixture was passed into a continuous pressure reactor at an initial liquor to solids ratio of about 2.5 to 1. In the reactor the mixture was subjected to a pressure of about 400 p.s.i.g. and a temperature of 230° C. for a dwell time of about 1.5 minutes. During the reaction, the pressure and temperature were attained and maintained by direct injection of steam. The material was transferred to a blow down cyclone separator which lowered the pressure to atmospheric pressure in one minute. The solid residue consisting of unhydrolyzed lignocellulose, and absorbed sugars was transferred to a washer where it passed countercurrent to a stream of water. This resulted in the displacement washing of the solids, leading to the separation of about 16,000 parts of an aqueous sugar solution containing about 12.5% sugar which was processed for removal of its impurities. These impurities consisted chiefly of organic materials, such as hydroxymethyl furfural, having an objectionable taste and making the untreated solution unpalatable to animals.

In an operation, as illustrated in the drawings, about eight tons of crude sugar solution comprising one ton sugar, and seven tons water (12.5 wt. percent sugar) was fed at ambient temperature (about 30° C.) to an eight-stage extractor countercurrent to a flow of about 40 tons of chloroform. The chloroform removed the objectionable organic impurities and the purified sugar solution, saturated with about 120 pounds of chloroform, was next fed to a conventional five-stage extractor in which 480 pounds of naphtha (90–120° C. boiling range) flowed at ambient temperature countercurrently to remove the chloroform from the sugar solution. The sugar solution was separated from the naphtha in a vaporizer maintained under steam-jet vacuum at a temperature of about 50–80° C. Naphtha was removed and passed together with steam vapor to a second five-stage extractor for the recovery of naphtha. The sugar solution at this point was free of solvents and impurities having an objectionable taste.

The chloroform discharged from the eight-stage extractor was countercurrently extracted with about 16 tons of water in a second eight-stage extractor to remove most of the impurities extracted from the sugar solution. The water containing about 240 pounds of dissolved chloroform from the second extractor was fed to the second five-stage extractor where 960 pounds of naphtha at ambient temperature was passed countercurrent to the water to remove the chloroform from the water. The naphtha stream containing chloroform from the second five-stage extractor was fed to a second vaporizer operating at about 150° C. to volatilize the chloroform and naphtha from the residual impurities. The combined vapors were then fed to a distillation column operating at a bottoms temperature between about 90 to 120° C. where the naphtha was separated from the chloroform and the individual streams of naphtha and chloroform were recycled to the extractors. The water discharged from the second five-stage extractor was heated between about 50 to 80° C. under steamjet vacuum to remove residual naphtha which was recycled to the second five-stage extractor. The purified sugar solution was then neutralized to a pH of 6–7. It was then blended with yeast and other feed materials and used as a livestock feed.

Although certain preferred embodiments of the invention have been disclosed for purpose of illustration, it will be evident that various changes and modifications may be made therein without departing from the scope and spirit of the invention.

I claim:
1. A process for the extraction of aqueous sugar solution resulting from the hydrolysis of lignocellulosic material which comprises
   (a) passing the aqueous sugar solution in contact with chloroform solvent in an extraction zone,
   (b) discharging from the extraction zone the chloroform solvent containing dissolved hydrolytic degradation products and a separate stream of a sugar solution substantially free from hydrolytic degradation products and contaminated with small amounts of chloroform,
   (c) passing the chloroform solvent containing the dissolved hydrolytic degradation products through a second extraction zone in contact with water to extract the bulk of the hydrolytic degradation products from the chloroform,
   (d) discharging from the second extraction zone a stream of chloroform and a separate stream of water containing the hydrolytic degradation products together with small amounts of chloroform and recycling the stream of chloroform to the first extraction zone,
   (e) passing the stream of water containing the hydrolytic degradation products together with small amounts of chloroform through a third extraction zone in contact with naphtha to separate the chloroform from the water,
   (f) discharging from the third extraction zone water containing small amounts of naphtha and a separate stream containing naphtha and chloroform,
   (g) heating said water and naphtha discharged from the third extraction zone to vaporize the naphtha, and recycling the naphtha back to the third extraction zone,
   (h) heating the chloroform-naphtha solution from the third extraction zone to separate the chloroform from the naphtha and recycling the chloroform to the first extraction zone,
   (i) recycling a portion of the separated naphtha back to the third extraction zone for further contact with water and chloroform from the second extraction zone,
   (j) passing the sugar solution discharged from the first extraction zone and containing small amounts of chloroform in contact with the remaining portion of naphtha in a fourth extraction zone to separate the chloroform from the water thereby producing a naphtha stream containing dissolved chloroform and a separate stream of substantially pure sugar solution contaminated with a small amount of naphtha,
   (k) discharging the naphtha stream from the fourth extraction zone and admixing the naphtha stream with the chloroform-naphtha from the third extraction zone,
   (l) discharging from the fourth extraction zone said sugar solution and heating said sugar solution to vaporize the naphtha leaving as residue a substantially pure sugar solution and,
   (m) recycling the vaporized naphtha back to the third extraction zone.

2. A process for the extraction of aqueous sugar solution resulting from the hydrolysis of lignocellulose material which comprises
   (a) passing the aqueous sugar solution in contact with chloroform solvent in an extraction zone at a chloroform to aqueous sugar solution weight ratio of from 4 to 1–6 to 1,
   (b) discharging from the extraction zone the chloroform solvent containing dissolved hydrolytic degradation products and a separate stream of a sugar solution substantially free from hydrolytic degradation products and contaminated with small amounts of chloroform,
(c) passing the chloroform solvent containing the dissolved hydrolytic degradation products through a second extraction zone in contact with water at a weight ratio of chloroform to water of from about 2 to 3, to extract the bulk of the hydrolytic degradation products from the chloroform,
(d) discharging from the second extraction zone a stream of chloroform and a separate stream of water containing the hydrolytic degradation products together with small amounts of chloroform and recycling the stream of chloroform to the first extraction zone,
(e) passing the stream of water containing the hydrolytic degradation products together with small amounts of chloroform through a third extraction zone in contact with naphtha at a weight ratio of naphtha to water of from about 0.02–0.2 to 1 to separate the chloroform from the water,
(f) discharging from the third extraction zone water containing small amounts of naphtha and a separate stream containing naphtha and chloroform,
(g) heating said water and naphtha discharged from the third extraction zone to vaporize the naphtha, and recycling the naphtha back to the third extraction zone,
(h) heating the chloroform-naphtha solution from the third extraction zone to separate the chloroform from the naphtha and recycling the chloroform to the first extraction zone,
(i) recycling a portion of the separated naphtha back to the third extraction zone for further contact with water and chloroform from the second extraction zone,
(j) passing the sugar solution discharged from the first extraction zone and containing small amounts of chloroform in contact with the remaining portion of naphtha in a fourth extraction zone to separate the chloroform from the water thereby producing a naphtha stream containing dissolved chloroform and a separate stream of substantially pure sugar solution contaminated with a small amount of naphtha,
(k) discharging the naphtha stream from the fourth extraction zone and admixing the naphtha stream with the chloroform-naphtha from the third extraction zone,
(l) discharging from the fourth extraction zone said sugar solution and heating said sugar solution to vaporize the naphtha leaving as residue a substantially pure sugar solution and,
(m) recycling the vaporized naphtha back to the third extraction zone.

3. A process for the extraction of aqueous sugar solution resulting from the hydrolysis of lignocellulose material which comprises
(a) passing the aqueous sugar solution in countercurrent contact with chloroform solvent in an extraction zone at a chloroform to aqueous sugar solution weight ratio of from 4 to 1–6 to 1,
(b) discharging from the extraction zone the chloroform solvent containing dissolved hydrolytic degradation products and a separate stream of a sugar solution substantially free from hydrolytic degradation products and contaminated with small amounts of chloroform,
(c) passing the chloroform solvent containing the dissolved hydrolytic degradation products through a second extraction zone in countercurrent contact with water at a weight ratio of chloroform to water of from about 2 to 3, to extract the bulk of the hydrolytic degradation products from the chloroform,
(d) discharging from the second extraction zone a stream of chloroform and a separate stream of water containing the hydrolytic degradation products together with small amounts of chloroform and recycling the stream of chloroform to the first extraction zone,
(e) passing the stream of water containing the hydrolytic degradation products together with small amounts of chloroform through a third extraction zone in countercurrent contact with naphtha at a weight ratio of naphtha to water of from about 0.02—0.2 to 1 to separate the chloroform from the water,
(f) discharging from the third extraction zone water containing small amounts of naphtha and a separate stream containing naphtha and chloroform,
(g) heating said water and naphtha discharged from the third extraction zone to vaporize the naphtha, and recycling the naphtha back to the third extraction zone,
(h) heating the chloroform-naphtha solution from the third extraction zone to separate the chloroform from the naphtha and recycling the chloroform to the first extraction zone,
(i) recycling a portion of the separated naphtha back to the third extraction zone for further countercurrent contact with water and chloroform from the second extraction zone,
(j) passing the sugar solution discharged from the first extraction zone and containing small amounts of chloroform in countercurrent contact with the remaining portion of naphtha in a fourth extraction zone to separate the chloroform from the water thereby producing a naphtha stream containing dissolved chloroform and a separate stream of substantially pure sugar solution contaminated with a small amount of naphtha,
(k) discharging the naphtha stream from the fourth extraction zone and admixing the naphtha stream with the chloroform-naphtha from the third extraction zone,
(l) discharging from the fourth extraction zone said sugar solution and heating said sugar solution to vaporize the naphtha leaving as residue a substantially pure sugar solution and,
(m) recycling the vaporized naphtha back to the third extraction zone.

4. A process for the extraction of aqueous sugar solution resulting from the hydrolysis of lignocellulose material which comprises
(a) passing the aqueous sugar solution in countercurrent contact with chloroform solvent in an extraction zone at a chloroform to aqueous sugar solution weight ratio of from 4 to 1–6 to 1, and at a temperature within the range of about 10 to 50° C.,
(b) discharging from the extraction zone the chloroform solvent containing dissolved hydrolytic degradation products and a separate stream of a sugar solution substantially free from hydrolytic degradation products and contaminated with about 1% by weight chloroform,
(c) passing the chloroform solvent containing the dissolved hydrolytic degradation products through a second extraction zone in countercurrent contact with water at a temperature within the range of 10 to 50° C., and at a weight ratio of chloroform to water of from about 2 to 3, to extract the bulk of the hydrolytic degradation products from the chloroform,
(d) discharging from the second extraction zone a stream of chloroform and a separate stream of water containing the bulk of the hydrolytic degradation products together with small amounts of chloroform and recycling the stream of chloroform to the first extraction zone, (e) passing the stream of water containing the hydrolytic degradation products together with small amounts of chloroform through a third extraction zone in countercurrent contact with naphatha at a temperature within the range of 10 to 50° C. and at a weight ratio of naphtha to water of from about 0.02—0.2 to 1 to separate the chloroform from the water, (f) discharging from the third extraction zone water containing naphtha and a separate stream containing naphtha and chloroform, (g) heating said water and naphtha discharged from the third extraction zone to vaporize the naphtha, and recycling the naphtha back to the third extraction zone, (h) heating the chloroform-naphtha solution from the third extraction zone at a temperature within the range of 60 to 130° C. to separate the chloroform from the naphtha and recycling the chloroform to the first extraction zone, (i) recycling a portion of the separated naphtha back to the third extraction zone for further countercurrent contact with water and chloroform from the second extraction zone, (j) passing the sugar solution discharged from the first extraction zone and containing chloroform in contact with the remaining portion of naphtha in a fourth extraction zone at a temperature within the range of 10 to 50° C. to separate the chloroform from the water thereby producing a naphtha stream containing dissolved chloroform and a separate stream of substantially pure sugar solution contaminated with naphtha, (k) discharging the naphtha stream from the fourth extraction zone and admixing the naphtha stream with the chloroform-naphtha from the third extraction zone, (l) discharging from the fourth extraction zone said sugar solution and heating said sugar solution to a temperature within the range of 25 to 50° C. to vaporize the naphtha leaving as residue a substantially pure sugar solution and, (m) recycling the vaporized naphtha back to the third extraction zone.

References Cited by the Examiner

UNITED STATES PATENTS 2,431,163 11/1947 Boehm et al. _____ 127—37 X
3,212,933 10/1965 Hess et al. _____ 127—37

MORRIS O. WOLK, *Primary Examiner.*

M. E. ROGERS, *Assistant Examiner.*